United States Patent [19]

Winberg

[11] 3,912,080
[45] Oct. 14, 1975

[54] CONTAINER OF PLASTIC FOIL
[76] Inventor: Ragnar O. Winberg, Silvakragatan 87, S-252 57 Helsingborg, Sweden
[22] Filed: Sept. 28, 1973
[21] Appl. No.: 401,871

[30] Foreign Application Priority Data
Sept. 29, 1972 Sweden.............................. 12518/72

[52] U.S. Cl................ 206/498; 93/36 DA; 206/446; 215/1 C; 215/12 R; 220/4 E; 229/51 AS; 229/51 D
[51] Int. Cl.²........................ B65D 3/26; B65D 5/70
[58] Field of Search ........... 206/446, 463, 484, 498; 93/36 DA, 35 PC; 215/1 C, 12 R; 220/4 E, 4 B, 69; 229/14 BE, 17 G, 51 AS, 51 D, 56, 66, 7 R

[56] References Cited
UNITED STATES PATENTS

| | | |
|---|---|---|
| 1,603,207 | 10/1926 | Huston.................................. 229/66 |
| 2,987,234 | 6/1961 | Kieckhefer........................ 229/17 G |
| 3,493,142 | 2/1970 | Assmann............................. 220/4 E |
| 3,527,439 | 9/1970 | Lawmaster.......................... 215/1 C |
| 3,633,780 | 1/1972 | Rausino .............................. 215/1 C |
| 3,770,185 | 11/1973 | Reeves.............................. 229/17 G |
| 3,776,375 | 12/1973 | Rohdin............................... 220/4 E |
| 3,802,324 | 4/1974 | Izumi et al. ....................... 93/36 DA |

*Primary Examiner*—William I. Price
*Assistant Examiner*—Bruce H. Bernstein
*Attorney, Agent, or Firm*—John J. Dennemeyer

[57] ABSTRACT

A container of plastic foil consists of two elongated half sections joined together as by heat bonding to form a cylindrical center portion and a reduced top and bottom portion. The center portion and the bottom portion are inserted in a mechanically stiff sleeve.

4 Claims, 5 Drawing Figures

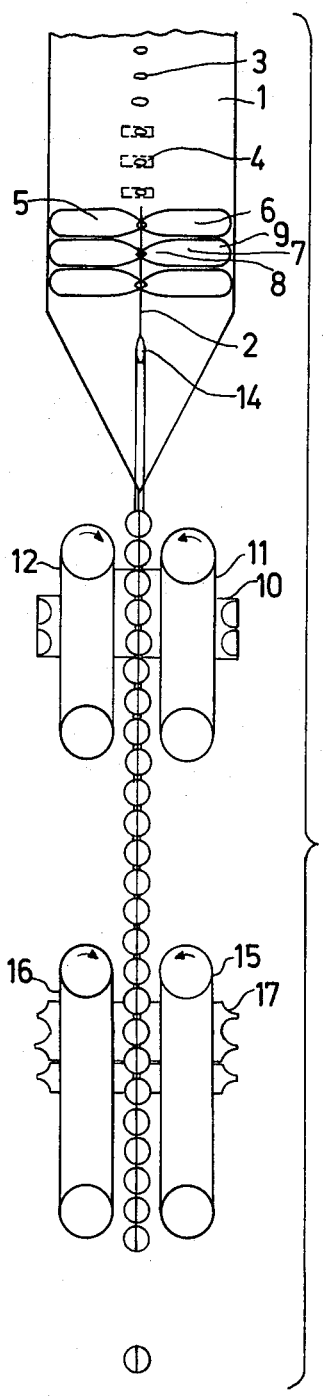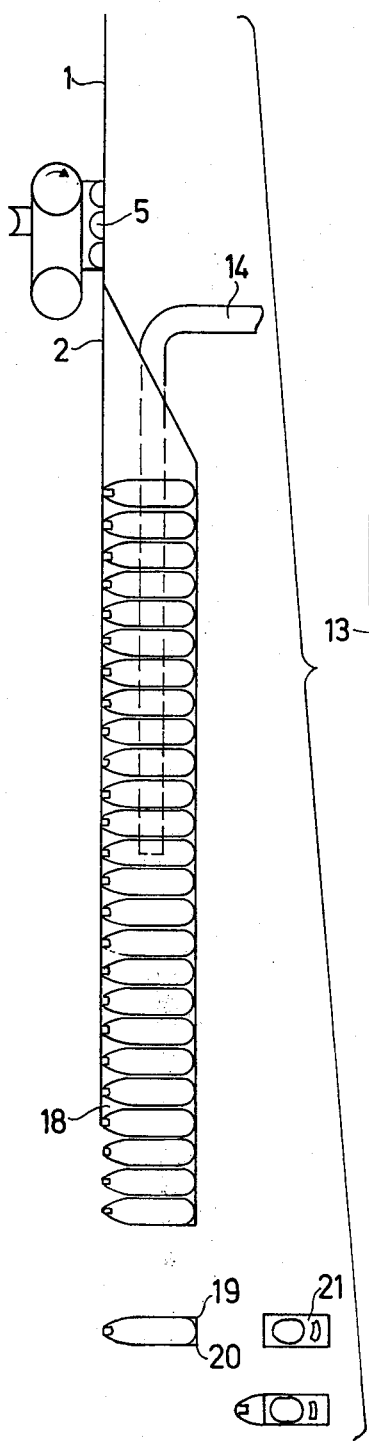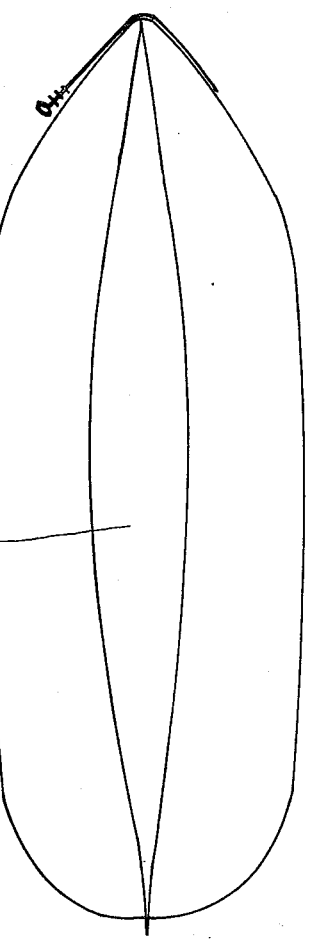
Fig. 1
Fig. 2
Fig. 3

Fig. 4
Fig. 5
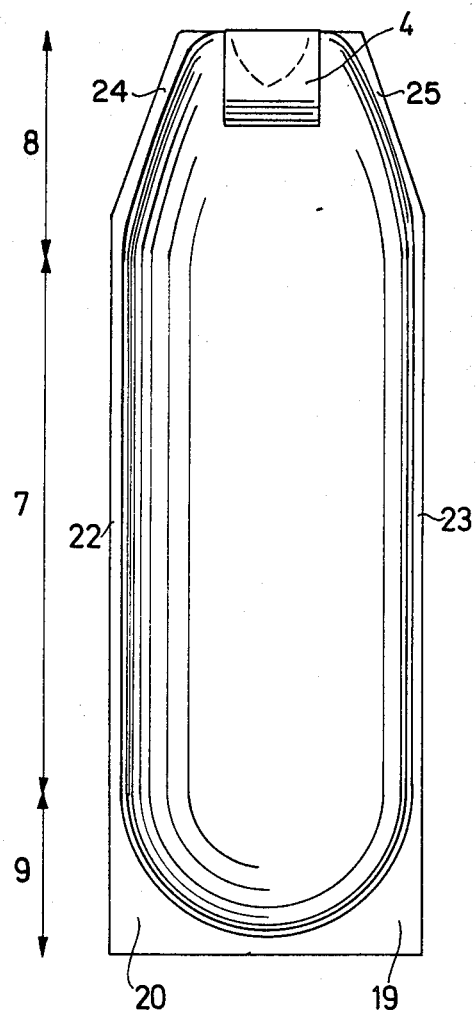
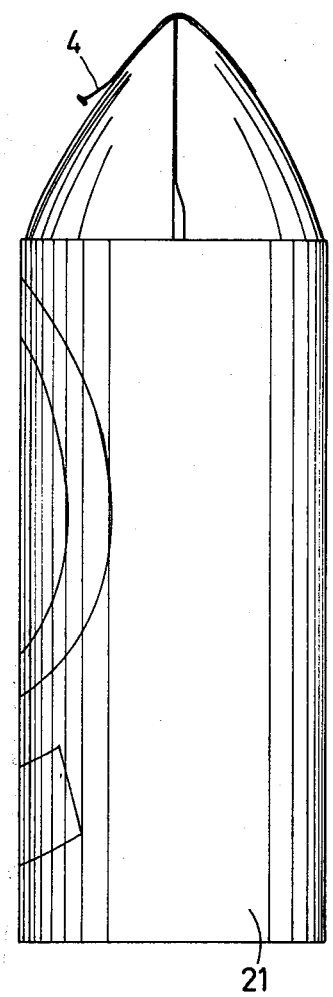

CONTAINER OF PLASTIC FOIL

The present invention relates to a container which is intended to be completely filled and comprises a lining of comparatively thin plastic foil which is resistant and impervious to the content of the container. The plastic lining comprises a center portion having a cylindrical shape, a dome-shaped, convex bottom portion, and a protruding top portion. The cylindrical center portion is surrounded by a tight-fitting stiff sleeve, one edge of the sleeve corresponding to the region where the center portion and the top portion join. The convex bottom portion is situated inside the sleeve at the opposite end thereof, this end of the sleeve serving as a foot for the container. The container is characterized mainly in that the lining is made up of two opposite halves having a separation plane concurrent with the center line of the sleeve in such a manner that laterally extending flange portions of the two halves are welded together and that the flanges which extend from the cylindrical portion are folded against the surface of the cylindrical portion, and are compressed between the latter and the sleeve.

If a pressure container is to be manufactured from a plastic sheet material, and if the bottom of the container is not allowed to become excessively thick, it has to be convex to a high degree. Containers which are tetrahedral or pillow-shaped are unsuitable. If the bottom is convex the container has to be provided with a foot, for example by means of a sleeve. This is easy when the container is smooth and cylindrical. It is also known to provide such cylindrical containers with a sleeve which forms a bottom support edge. Such containers, however, do not allow for rapid filling or they cannot be filled sterile. A container having a sleeve of this kind is described in U.S. Pat. No. 3,331,902. According to the teachings of that patent the container is filled at the same rate as it is manufactured, and this imposes a very slow production rate. The Swedish patent specification No. 313.376 describes a container which is manufactured prior to the filling and therefore does not allow for a sterile filling. This container is also not filled completely and therefore contains air. The filling is also slow since it takes place through the inlet opening which is only approximately 3 square centimeters. In the examples related it is not necessary that the lining be thin to allow the sleeve to be put on.

It is known per se that a container for liquids may be manufactured from two halves having a separation plane coinciding with the center line of the container, and joined along the protruding flanges of the respective halves. When such containers are required to stand by themselves the bottom has to be reasonably flat. These known containers were never intended as pressure containers nor for rapid filling.

If, however, the containers described in the previous paragraph were to be filled with a liquid capable of generating considerable pressure, such as beer, it would be obvious to increase the thickness of the material and, since the bottom cannot be made flat also to use a sleeve for support. The flanges where the halves are joined would, however, also be rather thick and not foldable in such a manner that the sleeve would tightly enclose the lining, i.e. neither of them could be made circular. No functional co-operation between lining and sleeve would be possible. Protruding flanges of non-circular shape are undesirable for distribution. On the other hand, if it were possible to make the bottom flat this would require such a large amount of material at the bottom as well as at the sides that thick protruding side flanges would be unavoidable.

Among the requirements for a container for liquids, in particular a container for beer, the following features are important. The container must be obtainable at low cost, it must be adapted to be filled quickly and preferably in a sterile manner, it must have a suitable opening, be easy to open, and after use be compressible to a small volume. Modern machines for filling beer bottles and cans have a capacity of more than ten units per second. Among the new plastic containers for beer some of the above requirements have been met, but up to now a rapid and sterile filling has not been possible. The present invention presents a solution to this problem and at the same time provides a good opening arrangement for the container.

The invention will now be described with reference to the accompanying drawings, in which:

FIG. 1 illustrates in a plan view the manufacturing procedure of a container according to the invention.

FIG. 2 illustrates the same procedure as in FIG. 1, but in a side view.

FIG. 3 illustrates a lining before welding.

FIG. 4 is a side view of a filled lining according to the invention.

FIG. 5 shows the lining of FIG. 4 rotated 90° and pulled into a cardboard sleeve.

For the manufacture of the lining according to the invention, a plastic foil may be used which is intended to be folded along the center line 2. Discharge openings 3 are punched in the foil. It is also possible to punch only indications for rupture. In place of one discharge opening several may be used. The openings may be placed on both sides of the folding line. It is possible, for example, to have one or more discharge openings on one side and an air opening on the other. If only one opening is used it may extend on both sides of the folding line. On each container the hole or holes are covered by a plastic strip 4. The strip may be attached to the foil about the hole or holes by welding or gluing. The opening means, i.e. the plastic strip 4, may be provided with a ring. The plastic foil with the opening means is transported for plastic shaping of the two halves 5 and 6. Each half comprises a cylindrical center portion or mantle 7 which is integral with a top 8 and a bottom 9. The shaping may be carried out by means of heat and pressure difference in a manner known per se so that the foil is shaped to conform closely to forming members which are movable in the direction of the container growth. During the shaping the foil is stretched 50% at the most. Since the stretching is small and no corners are present, this makes for a uniform thickness of the material. After the halves 5 and 6 have been shaped, the halves being positioned opposite relative to each other with their tops 8 against each other, the foil is folded about the folding line 2 in the middle of the foil so that the halves will be positioned against each other. It is, however, also possible to attach the opening strip 4 after the halves have been folded 135° about the folding line. It is further possible to attach the opening strip 4 after the halves have been shaped or in direct connection with the shaping. When the halves have been brought in contact with one another the bottom parts 9 are welded together, and there is accordingly a free connection between the liners because the mantle portions are not connected along their generating lines. Blocks 10 having recesses which fit the respective halves are arranged on two chains 11 and 12 and the blocks simultaneously seize the respective halves. The shape of the recess in the block is such that it does not conform to the final shape of the lining so that the linings, at their middle portions, are spaced a distance of approximately two centimeters apart. The distance along which the halves are not up against each other may be the entire length of the container which, in this case, is 15 centimeters. In this way an opening 13 is obtained as shown in FIG. 3, the surface area of the opening being approximately 14 square centimeters. If a container with approximately the same final shape as in the example were to be filled, with the longitudinal axis extending vertically, it would not be possible to have an opening longer than approximately 5 centimeters with a width of approximately 0.6 centimeter, i.e. an area of approximately 1.5 square centimeters.

It is of primary importance for the speed with which a container may be filled with beer that the opening be large. The attainable speed in this respect is one of the advantages of the invention. Since the shaping takes place immediately before the filling this may be done under sterile conditions.

The beer is conveyed down between the halves by a flat tube 14 which enters from the side above where the lining halves are held together at their bottom ends.

The filled containers are continuously fed downwards and enter between another pair of block-carrying chains 15 and 16. In the blocks 17 the recesses almost entirely correspond to the final shape of the container. The shape may, however, be such that the recesses are somewhat smaller than the shape of the containers so that the latter will not be entirely filled with beer so as to allow the upper part of the container to contain gas from the beer. Between the blocks 17 the halves are compressed and their protruding flanges are welded together by means of heating elements in the blocks. The containers are then separated by cutting. When filling foaming liquids, in particular beer, it is very advantageous if the joining of the halves can take place several container lengths below the surface of the liquid. When the cutting is done surplus material 18 at the top part may be removed also. At the bottom both of the flaps 19 and 20 may remain, in order to serve as handles when the lining is pulled into the cardboard sleeve 21. During the pulling the flanges 22 and 23 which extend from the cylindrical portion are folded so that they will be compressed between the cylindrical center portion and the sleeve. The cardboard sleeve serves to stiffen and strengthen the center portion, and makes it possible for the container to be placed upright. The cardboard sleeve also protects the content of the container against light, and the sleeve may be provided with printing and/or decorations. The top and bottom parts are so dimensioned that they withstand, without deformation, the forces during filling, transport and handling, whereas the cylindrical center portion or mantle requires the cardboard sleeve as mechanical support.

The container according to the present invention may be manufactured and filled in any suitable manner without departing from the invention.

Since that part of the top of the container where the discharge opening and the opening means are located is not welded when the container is closed, the hole as well as the opening means may be located on both sides of the joining line. This allows for a better location of the discharge opening thus making the pouring of the contents easier. It is also possible to have a discharge opening on one side and an air inlet opening on the opposite side, and both openings may be covered by the same sealing strip.

The plastic foil may be thicker in those regions which later are to form the top and bottom portions, compared to the thickness of the material in the center portion. This is made possible by the fact that the liners are manufactured with their center lines perpendicular to the direction of manufacture. In order to stiffen the top portion the plastic foil may be provided with a stiffening strip before or during manufacture. The strip should extend, on the manufactured container, from the upper edge of the cardboard sleeve, over the top of the container, and downwards to the edge of the cardboard sleeve.

According to the present invention the thin plastic lining may be manufactured in two halves with minimal material requirements, rapid shaping, and rapid as well as sterile filling. The stiff sleeve provides a foot for the container, improves the handling and takes up the internal forces from the pressurized content.

Briefly stated, the combination of a thin lining manufactured in two halves with foldable side flanges and a stiff sleeve comprise the inventive idea, and result in a new and improved container.

What is claimed is:

1. A container having a thin lining, the container including:
   a. a one-piece sheet of which the lining is comprised;
   b. a seamless fold in said sheet, said fold being disposed at the upper end of the container and defining first and second halves of said sheet;
   c. a discharge opening in the region of said seamless fold;
   d. each half of said sheet including a recess therein, each recess extending over a major portion of each half, said recesses of both halves co-operating to define a confined area within the lining;
   e. each sheet half including a flange half extending between the associated recess and the outer periphery of that sheet half;
   f. said flange halves defining a filling opening;
   g. said flange halves being joined together to form a flange about the container and to close said filing opening, said flange lying in a plane in which the center line of the container also lies;
   h. the lining including a cylindrical center portion terminating at one end into a convex, dome-shaped bottom portion and at the other end into a top portion;
   i. a mechanically stiff sleeve disposed about said center portion and bottom portion of the lining and tightly fitting said center portion;
   j. portions of said flange extending along said center portion of said lining being folded over and being compressed between said center portion and said sleeve.

2. A container according to claim 1, wherein portions of the flange halves extending from the bottom portion of the lining are shaped as handles.

3. A container according to claim 1, including a closure for said discharge opening, said closure comprising a continuous strip attached to said top portion on both sides of said seamless fold defining said sheet halves.

4. A container according to claim 3, wherein said discharge opening is disposed on both sides of said seamless fold defining said sheet halves.

* * * * *